(12) United States Patent
Cheon et al.

(10) Patent No.: US 8,625,042 B2
(45) Date of Patent: Jan. 7, 2014

(54) DISPLAY DEVICE

(75) Inventors: Kyu-Hyeong Cheon, Yongin (KR);
Dai-Han Cho, Yongin (KR);
Chan-Kyoung Moon, Yongin (KR);
Hyun-Hee Lee, Yongin (KR); Min-Su Kim, Yongin (KR); Hyun-Chuel Kim, Yongin (KR); Ji-Young Wang, Yongin (KR); Chan-Hee Wang, Yongin (KR);
Tae-Hyeok Kang, Yongin (KR);
Dong-Su Yee, Yongin (KR); Kyu-Seob Han, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 325 days.

(21) Appl. No.: 13/043,375

(22) Filed: Mar. 8, 2011

(65) Prior Publication Data

US 2012/0099251 A1    Apr. 26, 2012

(30) Foreign Application Priority Data

Oct. 22, 2010    (KR) .......................... 10-2010-0103496

(51) Int. Cl.
*G06F 1/16*    (2006.01)
(52) U.S. Cl.
USPC .................... 349/58; 361/679.21; 361/679.26; 248/917; 248/918
(58) Field of Classification Search
USPC ..................................... 361/679.21
See application file for complete search history.

(56) References Cited

U.S. PATENT DOCUMENTS

| 2007/0019275 A1* | 1/2007 | Okuda | 359/265 |
| 2008/0112116 A1* | 5/2008 | Kim | 361/681 |
| 2009/0310288 A1* | 12/2009 | Lee | 361/679.01 |
| 2011/0116220 A1* | 5/2011 | Lee | 361/679.02 |

FOREIGN PATENT DOCUMENTS

| KR | 10-2006-0037752 A | 5/2006 |
| KR | 10-2008-0014186 A | 2/2008 |
| KR | 10-2009-0043692 A | 5/2009 |

* cited by examiner

*Primary Examiner* — Anthony Q Edwards
(74) *Attorney, Agent, or Firm* — Knobbe, Martens, Olson & Bear LLP

(57) ABSTRACT

A display device is disclosed. In one embodiment, the device includes a display panel displaying an image and an integrated receiving member supporting the display panel. The integrated receiving member includes a press molding portion including a bottom portion and a side wall portion bent and extended from the bottom portion and having a through-hole formed therein and an injection molding portion including a frame portion integrally attached to at least one side of the press molding portion, facing the display panel and a flange portion extended from the frame portion and protruding through the through-hole. The flange portion of the injection molding portion is wholly or partially separated from the side wall portion of the press molding portion within the through-hole.

8 Claims, 2 Drawing Sheets

DISPLAY DEVICE

RELATED APPLICATIONS

This application claims priority to and the benefit of Korean Patent Application No. 10-2010-0103496 filed in the Korean Intellectual Property Office on Oct. 22, 2010, the entire contents of which are incorporated herein by reference.

BACKGROUND

1. Field

The described technology generally relates to a display device, more particularly, to a display device having improved durability and stability.

2. Description of the Related Technology

Most flat panel displays, such as a liquid crystal display (LCD), an organic light emitting diode (OLED), include a display panel formed through a thin film process and a receiving member receiving and supporting the display panel.

The receiving member includes various parts such as a mold frame and a chassis. The mold frame and the chassis have different thermal deformation volumes so that a failure may occur during a manufacturing process or while being used or durability may be deteriorated.

The above information disclosed in this Background section is only for enhancement of understanding of the background of the described technology and therefore it may contain information that does not form the prior art that is already known in this country to a person of ordinary skill in the art.

SUMMARY

One inventive aspect is a display device of which durability is improved and occurrence of a failure is suppressed.

Another aspect is a display device comprising: a display panel displaying an image and an integrated receiving member supporting the display panel. The integrated receiving member includes a press molding portion including a bottom portion and a side wall portion bent and extended from the bottom portion and having a through-hole formed therein and an injection molding portion including a frame portion integrally attached to at least one side of the press molding portion, facing the display panel and a flange portion extended from the frame portion and protruding through the through-hole. The flange portion of the injection molding portion is wholly or partially separated from the side wall portion of the press molding portion within the through-hole.

The flange portion of the injection molding portion may be wholly or partially separated from the side wall portion of the press molding portion by a distance of greater than about 0.5 mm.

The flange portion of the injection molding portion is protruded to a direction that crosses the side wall portion of the press molding portion, and may be extended along a length direction of the side wall portion.

One side of the flange portion, parallel with a side of the display panel, displaying an image may be formed in the shape of a trapezoid.

At least a part of corners between the frame portion of the injection molding portion and sides of the flange portion may be rounded.

The rounded corner may have a radius of greater than about 0.3 mm.

In the display device, the integrated receiving member may be formed using an insert injection method.

The press molding portion may be made of a metallic material.

The injection molding portion may be made of a resin-based material.

DETAILED DESCRIPTION

Figure 1:
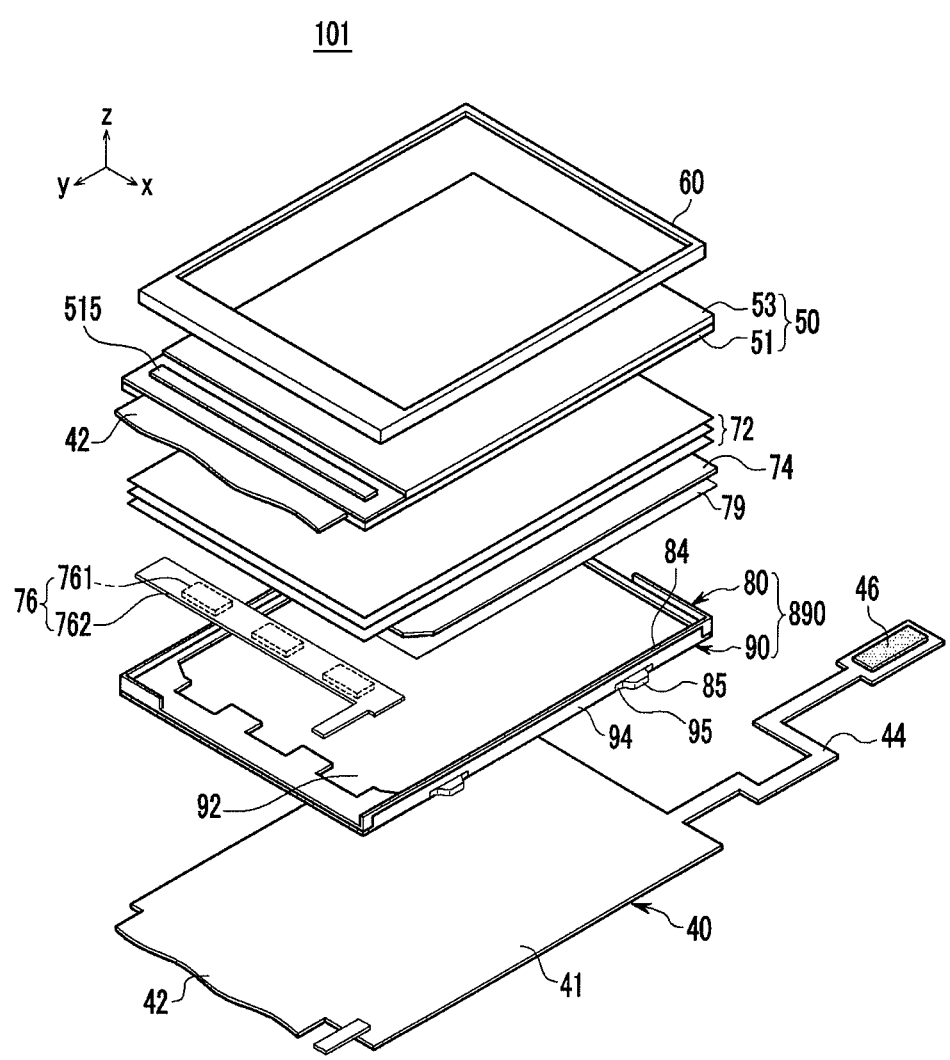
FIG. 1 is an exploded perspective view of a display device according to an embodiment.

Embodiments will be described more fully hereinafter with reference to the accompanying drawings. As those skilled in the art would realize, the described embodiments may be modified in various different ways.

Constituent elements having the same structures throughout the embodiments are denoted by the same reference numerals.

Furthermore, as the size and thickness of the respective structural components shown in the drawings are arbitrarily illustrated for explanatory convenience, and not considered limiting. In the drawings, for better understanding and ease of description, the thickness of layers, films, panels, regions, etc., may be exaggerated for clarity. It will be understood that when an element such as a layer, film, region, or substrate is referred to as being "on" another element, it can be directly on the other element or intervening elements may also be present.

Hereinafter, a display device 101 according to an embodiment will be described with reference to FIG. 1 and FIG. 2.

As shown in FIG. 1, the display device 101 includes a display panel 50 and an integrated receiving member 890 supporting the display panel 50. In one embodiment, the display panel 50 is a liquid crystal display panel. Thus, the display device 101 further includes a light source unit 76 required for light supply to the display panel 50, a light guiding plate 74, a reflective member 79, and a plurality of optical sheets 72.

In another embodiment, an organic light emitting display panel may be used as the display panel 50 instead of the liquid crystal display panel. In this case, the light source unit 76, the light guiding plate 74, the reflective member 79, and the plurality of optical sheets 72.

In addition, the display device 101 further includes a flexible printed circuit board (FPCB) 40 connected to one side of the display panel 50 to transmit a driving signal to the display panel 50 and an integrated circuit (IC) chip 515 installed on the display panel 50. In one embodiment, a protective layer is coated around the IC chip 515 to protect the IC chip 515.

In addition, the display device may further include a fixing member 60 for fixing the display panel 50 to the integrated receiving member 890, and other parts may further be included depending on the embodiment.

The display panel 50 includes a first substrate 51, a second substrate 53 arranged opposite to the first substrate 51, and a liquid crystal layer (not shown) disposed between the first and second substrates 51 and 53. Here, the first substrate 51 is a rear-side substrate and the second substrate 53 is a front-side substrate. In one embodiment, the second substrate 53 is smaller than the first substrate 51 in size.

The display panel 50 displays an image through a plurality of pixels. Here, the pixel is a minimum unit displaying an image. The first substrate 51 includes a thin film transistor (TFT) that is a switching element formed in each pixel and a pixel electrode connected with the thin film transistor. The second substrate 53 includes a common electrode. In one embodiment, at least one of the first substrate 51 and the second substrate 53 further includes a color filter. The liquid crystal layer (not shown) may be disposed between the pixel electrode of the first substrate 51 and the common electrode of the second substrate 53.

When the thin film transistor is turned on, an electric filed is formed between the pixel electrode and the common electrode. Due to the electric field, the liquid crystal layer (not shown) disposed between the first and second substrates 51 and 53 is changed and light transmittance of each pixel in the display panel 50 is changed.

With such a configuration, the display device 101 acquires a desired image by controlling transmittance of light passing through the display panel 50.

In addition, although it is not shown, the display panel 50 may further include polarizing plates respectively attached to a rear side of the first substrate 51 and a front side of the second substrate 53.

The IC chip 515 is mounted on an edge of the substrate 51 without being overlapped with the second substrate 53. In addition, the FPC board 40 is connected to the edge of the first substrate 51 where the IC chip 515 is mounted.

The FPC board 40 includes a substrate main body 41, a connection portion 42, and a connector portion 44. The substrate main body 41 is mounted with several circuit elements, and supplies a driving signal to the display panel 50. The connection portion 42 extends from one side of the substrate main body 41 and electrically connects the substrate main body 41 and the display panel 50. A connector 46 is formed at one end of the connector portion 44. Through the connector 46, the FPC board 40 receives a signal according to the degree of the opening of a folder window for a mobile phone and other signal information.

The light guiding plate 74 is arranged opposite to the rear side of the display panel 50. The light guiding plate 74 guides light emitted from the light source unit 76 and substantially transmits uniform light to the rear side of the display panel 50.

The light source unit 76 is disposed at one edge of the light guiding plate 74 and supplies light thereto. The light source unit 76 includes a plurality of light emitting diodes (LEDs) 761 and a substrate 762 used as a light source and installing the light emitting diodes 761. The substrate 762 used as a light source is connected with the FPC board 40 and receives a light source control signal. FIG. 1 illustrates three light emitting diodes 761, but the embodiment is not limited thereto. Thus, the number of light emitting diodes 761 may be variously controlled as necessary.

Further, FIG. 1 illustrates that the light source unit 76 is formed separately from the FPC board 40, but the present embodiment is not limited thereto. Thus, the FPC board 40 and the light source unit 76 may be integrally formed. That is, the light source unit 76 may be directly installed on the FPC board 40.

The reflective member 79 is arranged opposite to the rear side of the light guiding plate 74. The reflective member 79 functions to substantially reflect light incident from the light source unit 76 to the light guiding plate 74 and moving toward an opposite direction of the display panel 50 back to the light guiding plate 74. Thus, the reflective member 79 substantially reduces light loss and helps light diffusion in the light guiding plate 74.

The optical sheets 72 are disposed between the light guiding plate 74 and the display panel 50. The optical sheets 72 further diffuse light moving toward the display panel 50 from the light guiding plate 74 and reinforce luminance. In one embodiment, the optical sheets 72 include a diffusion sheet and a pair of prism sheets. In one embodiment, the diffusion sheet is arranged on the light guiding plate 74 opposite to each other to further diffuse light emitted from the light guiding plate 74. The prism sheets may be disposed on the diffuse sheet and collect light toward a front side direction. In one embodiment, the pair of prism sheets have waves formed in directions crossing each other.

In another embodiment, the optical sheets 72 have include various configurations known to a person skilled in the art.

The integrated receiving member 890 includes a press molding portion 90 and an injection molding portion 80. The press molding portion 90 is formed with a metallic material, and the injection molding portion 80 is formed with a resin-based material. The press molding portion 90 and the injection molding portion 80 are integrally formed through an insert injection method.

The press molding portion 90 includes a bottom portion 92 in the shape of a plate and a side wall portion 94 bent and extended from the bottom portion 92. In addition, at least one through-hole 95 is formed in the side wall portion 94.

The injection molding portion 80 includes a frame portion 84 integrally attached to at least one side of the press molding portion 90 and a flange portion 85 extended from the frame portion 84 and protruded while being penetrating through the through-hole 95. In this case, the flange portion 85 is partially or wholly separated from the side wall portion 94 in the through-hole 95. In further detail, as shown in FIG. 2, the flange portion 85 is partially or wholly separated from the side wall portion 94 in the through-hole 95 by a distance d greater than about 0.5 mm.

In addition, the flange unit 85 protrudes to a direction crossing the side wall portion 94. That is, the flange portion 85 protrudes to a direction substantially perpendicular to the side wall portion 94. In addition, the flange portion 85 is formed along a length direction of the side wall portion 94.

Further, a side of the flange portion 85, substantially parallel with a side of the display panel 50 displaying an image is formed in the shape of a trapezoid.

Figure 2:
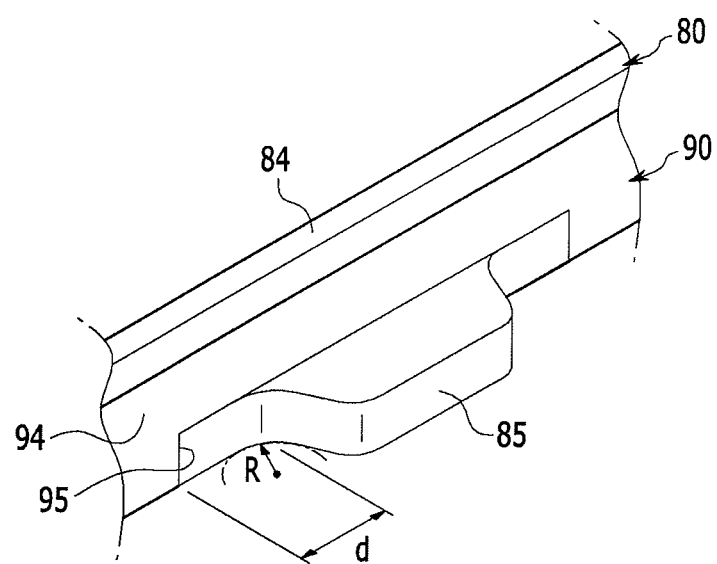
FIG. 2 is a partial perspective view of a flange portion of FIG. 1.

In addition, as shown in FIG. 2, corners between the frame portion 84 and the flange portion 85 protruded and extended from the frame portion 84 are at least partially rounded. In this case, the rounded corner has a radius R greater than about 0.3 mm. The rounded corner improves the strength of the flange portion 85 protruded from the frame portion 84. That is, the rounded corner suppresses the flange portion 85 from being easily separated from the frame portion 84. Further, the strength of the flange portion 85 is sufficiently improved when the radius of the rounded corner is greater than about 0.3 mm.

The flange portion 85 protruding through the side wall portion 94 may be used when the display device 101 is assembled to the module.

With such a configuration, the durability of the display device 101 can be improved and suppress possible device failure.

During a cooling process after the insert injection process for forming the integrated receiving member 890, an injection molding portion 80 cooled in the state of contacting the press molding portion 90 made of a metallic material and an injection molding portion 80 cooled in the state of not-contacting the press molding portion 90 have different cooling speed and thus a thermal stress occurs at the boundary therebetween and the injection molding portions 80 become easily broken. For example, the injection molding portion 80 is mostly cooled while being in contact with the press molding portion 90, but the flange portion 85 of the injection molding portion 80 is protruded so that it is cooled without being in contact with the press molding portion 90. In this case, as the flange portion 85 protruded through the through-hole 95 is adjacent to the side wall portion 94 and as the adjacent portion is increased, thermal stress is concentrated on a relatively weak portion in the injection molding portion 80, that is, the flange portion 85.

In one embodiment, the flange portion 85 is wholly or partially separated from the side wall portion 94 within the through-hole 95 so that the thermal stress is dispersed to the frame portion 84 rather than being concentrated on the flange portion 85. Thus, the flange portion 85 can be prevented from being easily broken by external impact.

However, when the flange portion 85 is wholly or partially separated from the side wall portion 94 within the through-hole 95 by a distance d of less than about 0.5 mm, the thermal stress concentrated on the flange portion 85 cannot be sufficiently dispersed.

According to at least one of the disclosed embodiments, durability of the display device 101 can be wholly improved. Further, occurrence of a failure can be suppressed.

While the described embodiments have been described in connection with the accompanying drawings, it is to be understood that the disclosed embodiments are not considered limiting. Thus, various modifications and equivalent arrangements are included within the spirit and scope of the appended claims.

What is claimed is:

1. A display device comprising:
   a display panel configured to display an image; and
   an integrated receiving member supporting the display panel,
   wherein the integrated receiving member comprises:
   a press molding portion including i) a bottom portion and ii) a side wall portion bent and extending from the bottom portion, wherein a through-hole is formed in the press molding portion; and
   an injection molding portion including i) a frame portion integrally attached to at least one side of the press molding portion facing the display panel and ii) a flange portion extending from the frame portion and protruding through the through-hole,
   wherein the flange portion of the injection molding portion is wholly or partially separated from the side wall portion of the press molding portion within the through-hole.

2. The display device of claim 1, wherein the flange portion of the injection molding portion is wholly or partially separated from the side wall portion of the press molding portion by a distance of greater than about 0.5 mm.

3. The display device of claim 1, wherein the flange portion of the injection molding portion protrudes in a direction that crosses the side wall portion of the press molding portion, and extends along a longer side of the side wall portion.

4. The display device of claim 3, wherein one side of the flange portion is substantially parallel with a side of the display panel and is formed in the shape of a trapezoid.

5. The display device of claim 3, wherein at least part of the corners between the frame portion of the injection molding portion and sides of the flange portion is rounded.

6. The display device of claim 5, wherein the rounded corner has a radius of greater than about 0.3 mm.

7. The display device of claim 1, wherein the press molding portion is formed of a metallic material.

8. The display device of claim 1, wherein the injection molding portion is formed of a resin-based material.

* * * * *